(12) United States Patent
Zhan et al.

(10) Patent No.: US 10,092,134 B2
(45) Date of Patent: Oct. 9, 2018

(54) WAFFLE MAKER

(71) Applicant: Tsann Kuen (Zhangzhou) Enterprise Co., Ltd., Zhangzhou (CN)

(72) Inventors: Yixin Zhan, Zhangzhou (CN); Dongmei Chen, Zhangzhou (CN)

(73) Assignee: Tsann Kuen (Zhangzhou) Enterprise Co., Ltd., Zhangzhou (CN)

( * ) Notice: Subject to any disclaimer, the term of this patent is extended or adjusted under 35 U.S.C. 154(b) by 0 days.

(21) Appl. No.: 14/739,113

(22) Filed: Jun. 15, 2015

(65) Prior Publication Data

US 2016/0213197 A1    Jul. 28, 2016

(30) Foreign Application Priority Data

Jan. 28, 2015    (CN) .......................... 2015 1 0043872

(51) Int. Cl.
*A47J 37/06*    (2006.01)

(52) U.S. Cl.
CPC .................................. *A47J 37/0611* (2013.01)

(58) Field of Classification Search
CPC .................. A47J 37/0611; A47J 2037/0617
USPC .......................................... 99/356, 372–380
See application file for complete search history.

(56) References Cited

U.S. PATENT DOCUMENTS

| 1,546,347 | A | * | 7/1925 | Simmons | A47J 37/0611 99/373 |
|---|---|---|---|---|---|
| 4,178,500 | A | * | 12/1979 | Brindopke | A47J 37/0611 219/386 |
| 5,299,492 | A | | 4/1994 | Carbon et al. | |
| 5,937,742 | A | * | 8/1999 | Steeb | A47J 37/0611 99/375 |
| 2008/0257169 | A1 | * | 10/2008 | Tienor | A47J 37/0611 99/377 |
| 2009/0049993 | A1 | * | 2/2009 | Morgan | A47J 37/0885 99/375 |
| 2010/0024662 | A1 | * | 2/2010 | Bengtson | A47J 37/0611 99/377 |
| 2016/0007799 | A1 | * | 1/2016 | Steeb | A21D 13/0035 426/275 |

* cited by examiner

*Primary Examiner* — Michael Laflame, Jr.
(74) *Attorney, Agent, or Firm* — Husch Blackwell LLP

(57) ABSTRACT

A waffle maker includes a first grill member and a second grill member openably coupled to the first grill member. The first grill member has a grill body and a cross-shaped rib mounted in a receiving space of the grill body. The cross-shaped rib has first rib portions, second rib portions under the first rib portions when the first grill member is at an upright state, and a cross-shaped notch. The cross-shaped notch has first notch portions extending respectively along the first rib portions, and second notch portions extending respectively along the second rib portions and communicating with the first notch portions. Each of the first notch portions has a length larger than that of each of the second notch portions.

9 Claims, 5 Drawing Sheets

WAFFLE MAKER

CROSS-REFERENCE TO RELATED APPLICATION

This application claims priority to Chinese Application No. 201510043872.0, filed on Jan. 28, 2015.

FIELD

The disclosure relates to a waffle maker, and more particularly to a waffle maker including a grill member that is rotatable to an upright state.

BACKGROUND

A conventional upright-type waffle maker includes two grill members that are openably coupled to each other and that cooperates with each other to define a baking space. Each of the grill members has a grill body and a cross-shaped rib. The grill body has an internal receiving space that forms a part of the baking space, and a batter inlet that is formed in a top end thereof and that communicates with the internal receiving space and with the external environment. The cross-shaped rib is mounted in the internal receiving space.

The cross-shaped ribs of the grill members project toward each other without contact, thereby forming a gap therebetween within the baking space and roughly dividing the baking space into four compartments. After the conventional upright-type waffle maker made a waffle the waffle may have a thinner cross-shaped portion formed by the cross-shaped ribs of the grill members which makes the waffle to be conveniently divided or sliced.

In order to make the waffle, batter is poured into the baking space through the batter inlets of the grill members, and passes through the gap between the cross-shaped ribs of the grill members to gradually fill the four compartments of the baking space, while air in the baking space is expelled by the batter through the gap between the cross-shaped ribs of the grill members and the batter inlet. However, in actual use, during pouring the batter into the baking space, since the batter is viscous and relatively heavy, the air may not be effectively and completely expelled from the baking space, such that the baking space may not be evenly filled with the batter. As a result, the finished waffle may have ununiformed waffle thickness and edge defects.

SUMMARY

Therefore, an object of the disclosure is to provide a waffle maker that can alleviate the drawback of the prior art.

According to the disclosure, the waffle maker includes a first grill member and a second grill member openably coupled to the first grill member. The first grill member has a grill body and a cross-shaped rib.

The grill body defines an internal receiving space therein, and has a batter inlet formed in a periphery thereof and communicating with the internal receiving space and with the external environment.

The cross-shaped rib is mounted in the internal receiving space and has a center, two adjacent first rib portions, two adjacent second rib portions and a cross-shaped notch.

The first rib portions project from the center and respectively toward two regions of the periphery of the grill body which are respectively adjacent to two opposite ends of the batter inlet.

The second rib portions project from the center and away from the batter inlet.

The cross-shaped notch has two first notch portions that extend from the center and respectively along the first rib portions, and two second notch portions that extend from the center and respectively along the second rib portions, and that communicate with the first notch portions. Each of the first notch portions has a length along a respective one of the first rib portions larger than a length of each of the second notch portions along a respective one of the second rib portions. The first grill member is rotatable about an axis to an upright state for pouring of batter, where the batter inlet is at top of the grill body, where the cross-shaped rib is disposed under the batter inlet, and where the first and second rib portions are inclined relative to the axis.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
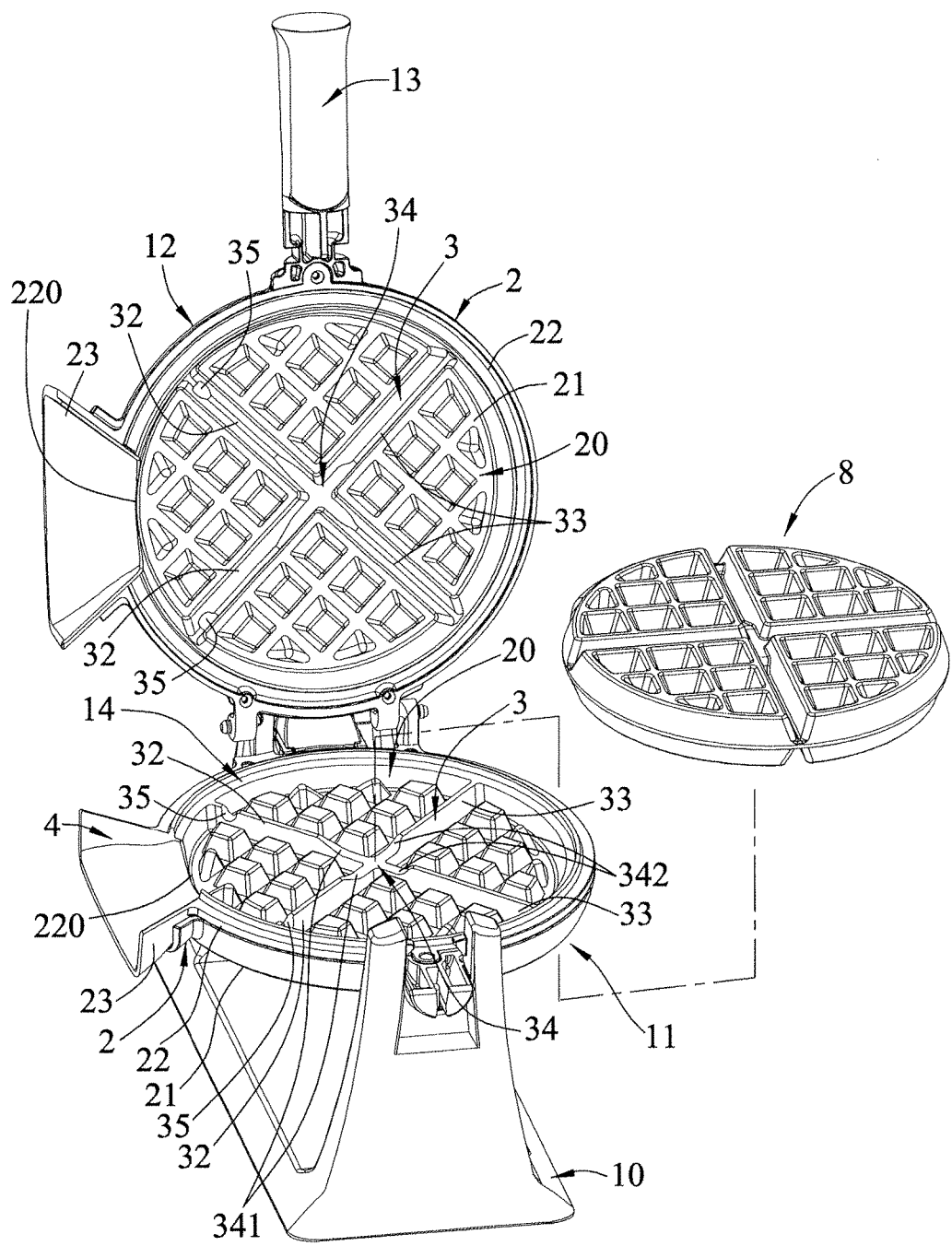
FIG. 1 is a perspective view illustrating a first embodiment of a waffle maker according to the disclosure.

Before the present disclosure is described in greater detail, it should be noted that like elements are denoted by the same reference numerals throughout the disclosure.

Figure 2:
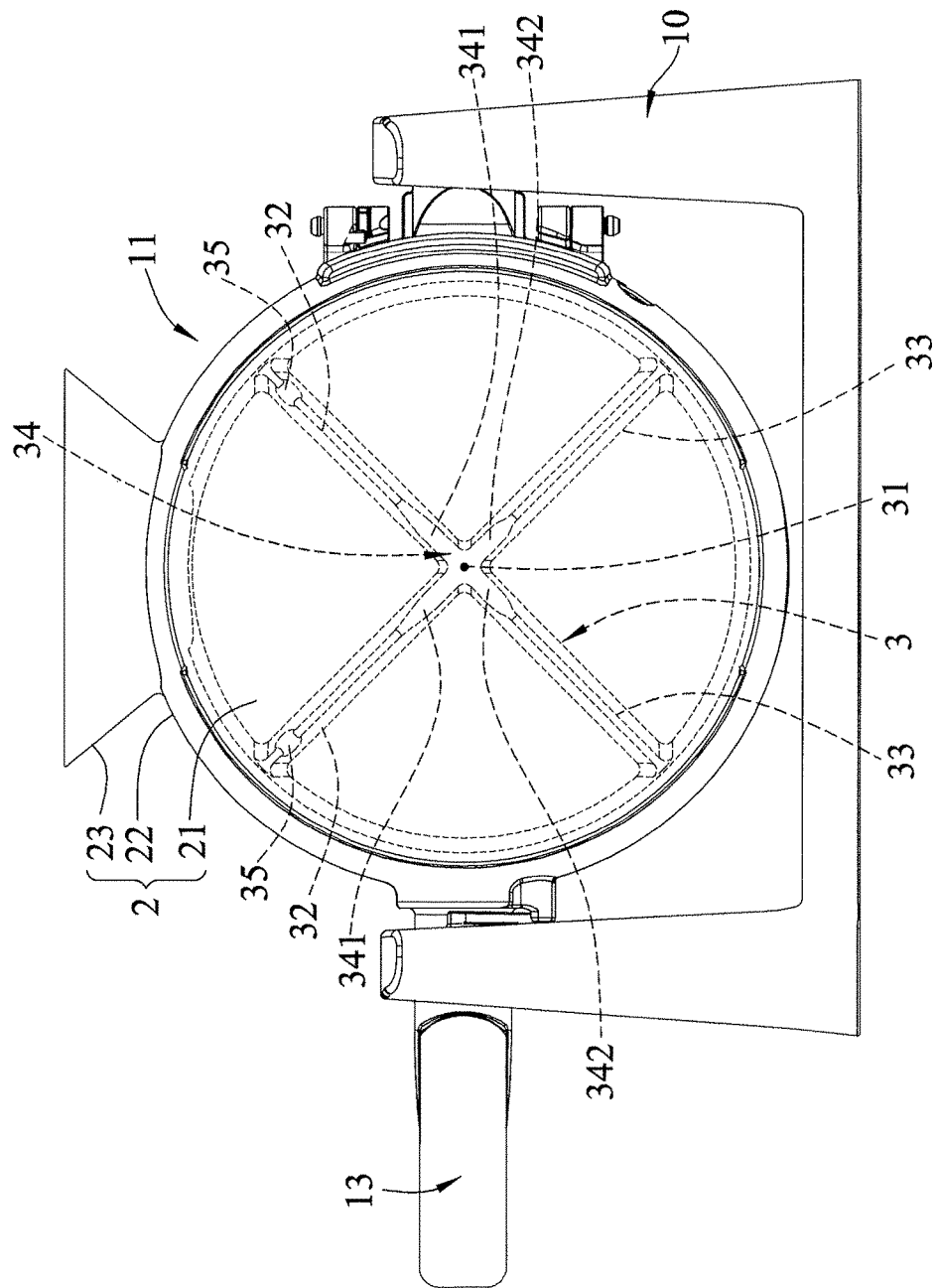
FIG. 2 is a side view of the first embodiment.
Figure 3:
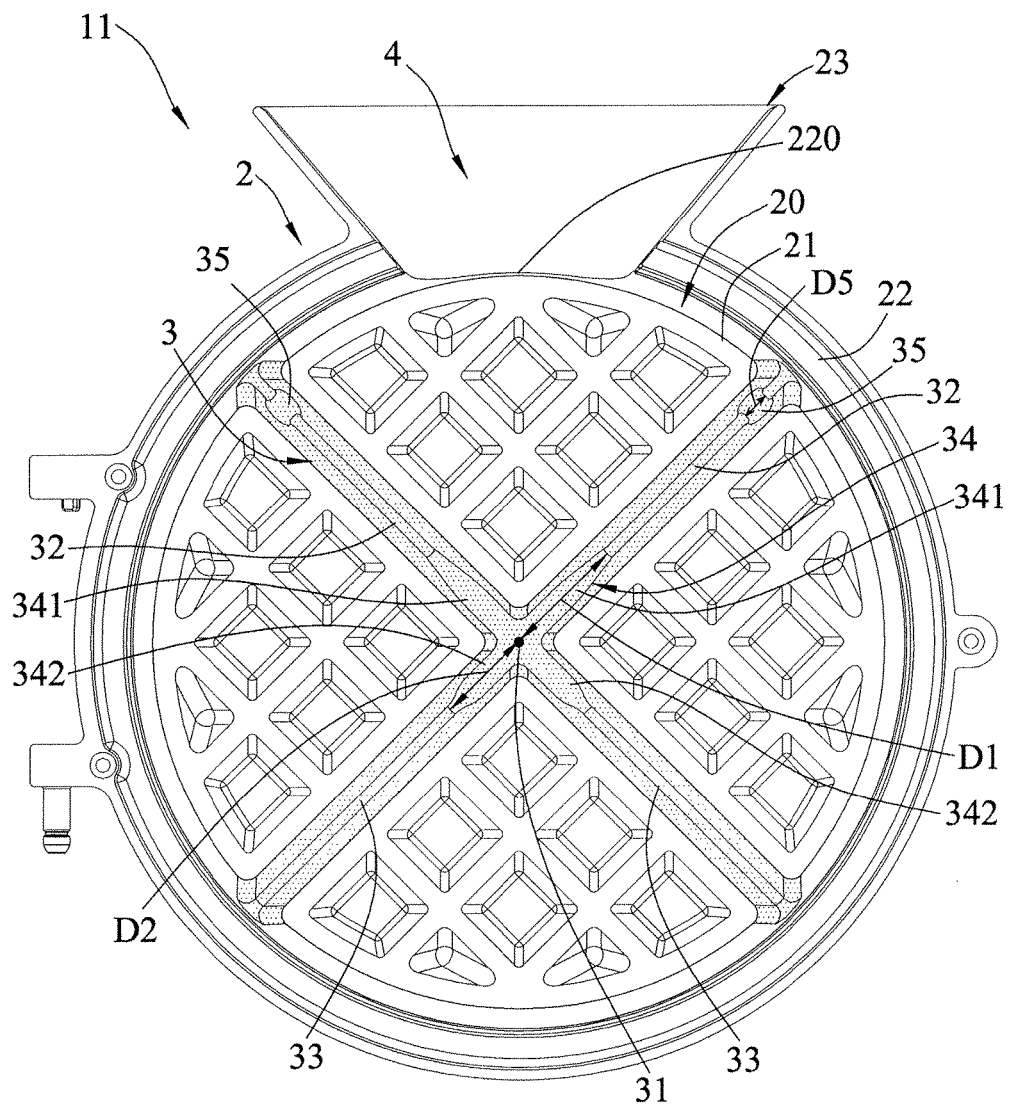
FIG. 3 is a side view of a first grill member of the first embodiment.

Referring to FIGS. 1 to 3, a first embodiment of a waffle maker according to the disclosure is illustrated. The waffle maker includes a base 10, first and second grill members 11, 12 that are rotatably connected to the base 10, and a handle 13 that is mounted to the second grill member 12.

In this embodiment, the base 10 is adapted to be placed on a reference surface, and the first and second grill members 11, 12 are rotatable relative to the base 10 about an axis to an upright state (see FIG. 2) for pouring of batter to make a waffle 8. Since the feature of the waffle maker according the disclosure does not reside in the configuration of the base 10, details of the same are omitted herein for the sake of brevity. In addition, the base 10 can even be omitted from the waffle maker. For example, a user can grasp the handle 13 to maintain the first and second grill members 11, 12 at the upright state.

As shown in FIG. 1, the second grill member 12 is openably coupled to the first grill member 11 and cooperates with the first grill member 11 to define a baking space 14 that can receive the batter to make the waffle 8. The handle 13 is configured that, when the second grill member 12 is coupled to the first grill member 11, the handle 13 can secure the second grill member 12 to the first grill member 11 in a tight manner. Since the feature of the waffle maker according the disclosure does not reside in the configuration of the handle 13 and the connection structure among the handle 13 and the first and second grill members 11, 12, details of the same are omitted herein for the sake of brevity. Alternatively, the handle 13 can be mounted to the first grill member 11.

In this embodiment, the second grill member 12 has a structure identical to that of the first grill member 11, so that only the first grill member 11 is illustrated hereinafter. In other embodiments of this disclosure, the structures of the first and second grill members 11, 12 may be partially or entirely different from each other as long as the first and second grill member 11, 12 can be coupled together and cooperatively define the baking space 14.

In this embodiment, the first grill member 11 has a grill body 2, a cross-shaped rib 3 and a heating unit (not shown) disposed in the grill body 2. As shown in FIG. 3, in order to differentiate from the grill body 2, the cross-shaped rib 3 is illustrated with dots. In addition, the grill body 2 defines an internal receiving space 20 therein which forms a half portion of the baking space 14, and has a batter inlet 220 formed in a periphery thereof and communicating with the internal receiving space 20 and with the external environment. The cross-shaped rib 3 is mounted in the internal receiving space 20. The heating unit is disposed for heating the grill body 2 and the cross-shaped rib 3. Since the feature of the waffle maker according the disclosure does not reside in the configuration of the heat unit, details of the same are omitted herein for the sake of brevity.

Referring to FIGS. 2 and 3, the grill body 2 further has a plate portion 21, a surrounding portion 22 and a funnel portion 23. The surrounding portion 22 extends from a periphery of the plate portion 21, cooperates with the plate portion 21 to define the internal receiving space 20, and is formed with the batter inlet 220. The funnel portion 23 extends outwardly from the surrounding portion 22 adjacent to the batter inlet 220. In addition, the plate portion 21 has a plurality of spaced-apart protrusions projecting into the internal receiving space 20, thereby increasing a heating area that contact the batter and facilitating heat distribution. In addition, the funnel portions 23 of the first and second grill members 11, 12 cooperatively define a funnel-shaped passage 4 that is in spatial communication with and that converges toward the batter inlets 220 of the first and second grill members 11, 12. The internal receiving space 20 of the grill body 2 of the second grill member 12 forms a half portion of the baking space 14 (i.e., the baking space 14 has the internal spaces 20 of the first and second grill members 11, 12).

The cross-shaped rib 3 is disposed on the plate portion 21 and is directly connected to the surrounding portion 22. In this embodiment, the cross-shaped rib 3 has a center 31, two adjacent first rib portions 32, two adjacent second rib portions 33, a cross-shaped notch 34 and a plurality of ventilation notches 35. The two adjacent first rib portions 32 project from the center 31 and respectively toward two regions of the periphery of the grill body 2 which are respectively adjacent to two opposite ends of the batter inlet 220. The two adjacent second rib portions 33 project from the center 31 and away from said batter inlet 220. The first and second rib portions 32, 33 are equiangularly disposed about the center 31.

The cross-shaped notch 34 has two first notch portions 341 and two second notch portions 342. The first notch portions 341 extend from the center 31 and respectively along the first rib portions 32. The second notch portions 342 extend from the center 31 and respectively along the second rib portions 33, and communicate at the center 31 with the first notch portions 341. Each of the first notch portions 341 having a length (D1) along a respective one of the first rib portions 32 larger than a length (D2) of each of the second notch portions 342 along a respective one of the second rib portions 33. When the first grill member 11 is rotated about the axis to the upright state, the batter inlet 220 is at top of the grill body 2, the cross-shaped rib 3 is disposed under the batter inlet 220, and the first and second rib portions 32, 33 are inclined relative to the axis.

The ventilation notches 35 are respectively recessed in the first rib portions 32, and are disposed distal from the center 31 of the cross-shaped rib 3 and adjacent to the surrounding portion 22.

In use, when the first and second grill members 11, 12 are rotated to the upright state, the batter is poured through the funnel-shaped passage 4 and the batter inlets 220 of the first and second grill members 11, 12 into the baking space 14. Since the cross-shaped notch 34 is disposed under the batter inlet 220 and since the length (D1) of each of the first notch portions 341 is greater than the length (D2) of each of the second notch portions 342, a part of the batter can directly fall down into and uniformly fill a compartment of the baking space 14 that is divided between the second rib portions 33 of the cross-shaped ribs 3 of the first and second grill members 11, 12 while the rest of the batter uniformly fill compartments of the baking space 14 that are divided between each of the first rib portions 32 and an adjacent one of the second rib portions 33 of the cross-shaped ribs 3 of the first and second grill members 11, 12. Consequently, the finished waffle 8 from the waffle maker of the disclosure has uniform waffle thickness without edge defects.

It should be noted that, if the length (D1) of each of the first notch portions 341 is designed to be smaller than the length (D2) of each of the second notch portions 342, the first rib portions 32 will impede the batter filling into the compartments of the baking space 14 that are divided between each of the first rib portions 32 and an adjacent one of the second rib portions 33 of the cross-shaped ribs 3 of the first and second grill members 11, 12.

In actual implementation, the length (D1) of each of the first notch portions 341 ranges between 15 millimeters and 45 millimeters, and the length (D2) of each of the second notch portions 342 ranges between 10 millimeters and 35 millimeters.

When the length (D1) of each of the first notch portions 341 is smaller than 15 millimeters or when the length (D2) of each of the second notch portions 342 is smaller than 10 millimeters, the cross-shaped notch 34 of each of the first and second grill members 11, 12 is insufficient for the batter to smoothly flow through and fill the receiving spaces 20 of the first and second grill members 11. When the length (D1) of each of the first notch portions 341 is greater than 45 millimeters or when the length (D2) of each of the second notch portions 342 is greater than 35 millimeters, though the batter can easily fill the receiving spaces 20 of the first and second grill members 11, parts of the finished waffle 8 which correspond to the first or second rib portions 32, 33 will be unduly thick, so that the finished waffle 8 is inconvenient to be cut.

Since the ventilation notches 35 are respectively recessed in the first rib portions 32, when the batter is poured into the baking space 14, air in the receiving space 20 is sufficiently and effectively expelled out from the batter inlet 220 through the ventilation notches 35, thereby facilitating complete filling of the batter within the receiving space 20. In actual implementation, each of the ventilation notches 35 has a length (D5) along a respective one of the first rib portions 32 ranging between 2 millimeters and 15 millimeters.

If the length (D5) of each of the ventilation notches 35 is smaller than 2 millimeters, what is reduced is the effect of expelling the air in the receiving space 20. If the length (D5) of each of the ventilation notches 35 is larger than 15 millimeters, though it is quite excellent to expel the air in the receiving space 20, parts of the finished waffle 8 which correspond to the first rib portions 32 will be unduly thick.

Since the funnel-shaped passage 4 converges toward the batter inlets 220 of the first and second grill members 11, 12, it is convenient for the user to pour the batter therein. In addition, since the batter filled in the receiving space 20 grow in size when being heated to become the waffle 8, the funnel-shaped passage 4 can receive the expanded portion of the batter and prevent overflow of the batter from the first and second grill member 11, 12.

Figure 4:
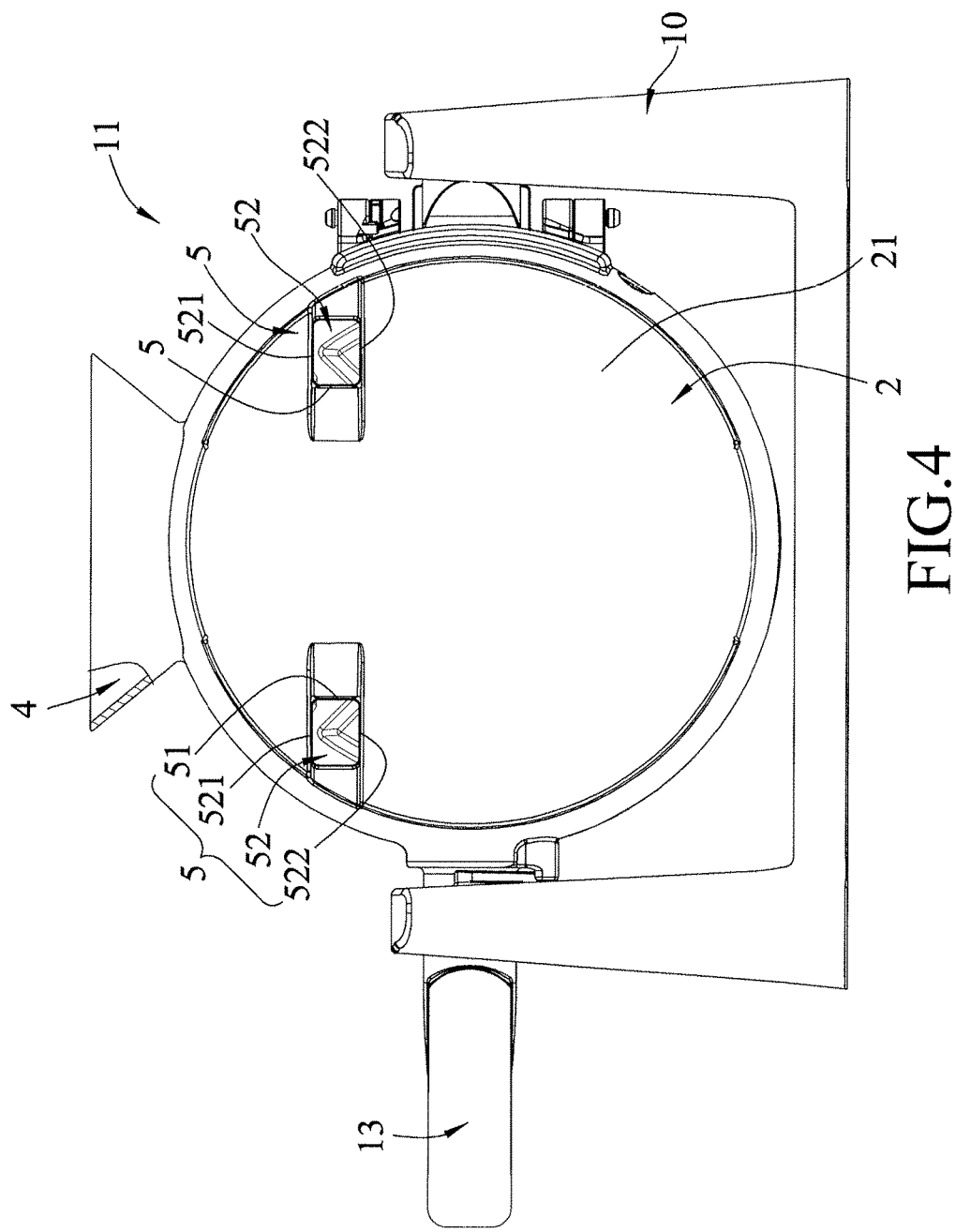
FIG. 4 is a side view of a second embodiment of the waffle maker according to the disclosure.

FIG. 4 illustrates a second embodiment of a waffle maker according to the disclosure, which has a configuration similar to that of the first embodiment. However, in the second embodiment, the first grill member 11 further has a plurality of viewing units 5 that are mounted in the grill body 2. As shown in FIG. 4, the number of the viewing unit 5 is 2. In other embodiments of this disclosure, the grill body 2 of the second grill member 12 may also be formed with at least one of the viewing units 5.

In this embodiment, each of the viewing units 5 has a through hole 51 and a light transmissive component 52. The through hole 51 is located in an upper half of the grill body 2 when the first grill member 11 is at the upright state, extends through the grill body 2 and is in spatial communication with the backing space 14. The light transmissive component 52 is inserted into the through hole 51 for observing pouring operation of the batter in the baking space 14 (see FIG. 1).

In actual implementation, for each of the viewing units 5, the light transmissive component 52 has a top edge 521 and a bottom edge 522 opposite to the top edge 521. When the first and second grill members 11, 12 are at the upright state, the bottom edge 522 represents a minimum level for pouring the batter into the baking space 14. If the top end of the poured batter is below the bottom edge 522, i.e., the poured batter is unseen from the light transmissive component 52, the batter is insufficiently poured into the baking space 14. As a result, the finished waffle 8 may have defect edges. In addition, the top edge 521 represents a maximum level for pouring the batter into the baking space 14. When the top end of the poured batter is above the top edge 521 of the light transmissive component 52, the batter is excessive for filling the baking space 14 and may overflow from the funnel-shaped passage 4 during making the waffle 8.

Figure 5:
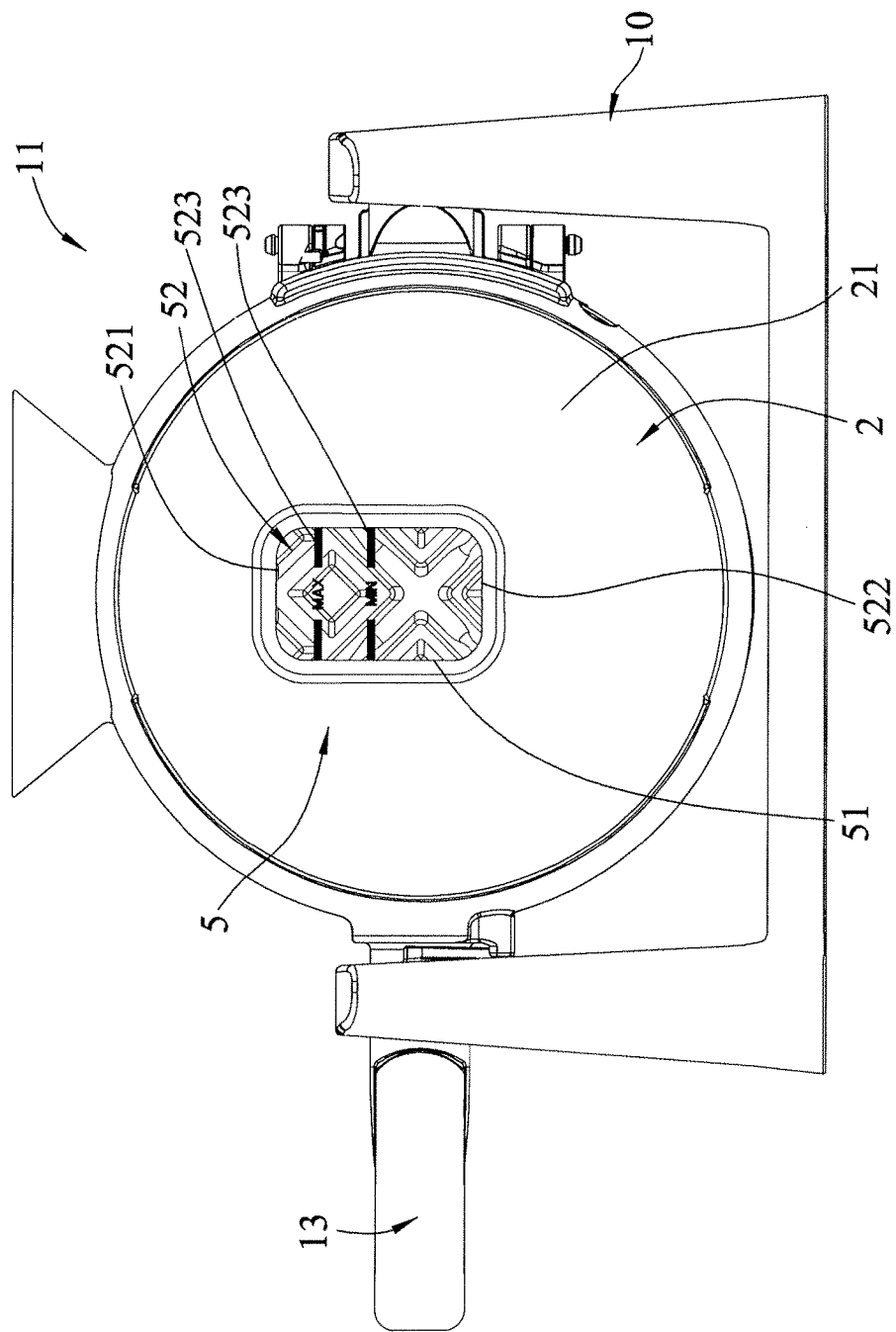
FIG. 5 is a side view of a third embodiment of the waffle maker according to the disclosure.

FIG. 5 illustrates a third embodiment of a waffle maker according to the disclosure, which has a configuration similar to that of the second embodiment. However, in the third embodiment, the first grill member 11 has only one viewing unit 5 that is structurally different from that of the second embodiment.

In this embodiment, the through hole 51 extends from upper to lower halves of the grill body 2 when the first grill member 11 is at the upright state. The light transmissive component 52 has two identification marks 523, as shown in FIG. 4. Accordingly, the user can observe the identification marks 523 to determine volume of the batter poured into the baking space 14.

In actual implementation, the identification marks 523 can be permanently etched or printed on a surface of the light transmissive component 52. Alternatively, the identification marks 523 can be, but is not limited, in the form of a sticker that are removably adhered to the surface of the light transmissive component 52.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A waffle maker comprising:
a first grill member comprising
a grill body comprising a plate portion, said plate portion defining a rotational plane, and an axis contained in said rotational plane; a surrounding portion cooperating with said plate portion to define an internal receiving space, and formed with a batter inlet; and a funnel portion extending outwardly from said surrounding portion adjacent to said batter inlet, and communicating with said internal receiving space; and
a second grill member coupled to said first grill member and adapted to transition between a closed state and an open state;
one of said first grill member and said second grill member being rotatable about said axis relative to the other one of said first grill member and said second grill member to transition said second grill member from the closed state to the open state;
wherein, during the transition of said second grill member from the closed state to the open state, the other one of said first grill member and said second grill member is positioned horizontally with respect to said axis;
wherein said first grill member further comprises a rib on said plate portion, said rib comprising:
a center;
two adjacent first rib portions that project from said center and respectively toward two regions adjacent to two opposite ends of said batter inlet; and
two adjacent second rib portions that project from said center and away from said batter inlet; and
wherein said rib further comprising a notch having two first notch portions extending from said center and respectively along said first rib portions, and two second notch portions extending from said center and respectively along said second rib portions, and communicating with said first notch portions, each of said first notch portions having a length along a respective one of said first rib portions greater than a length of each of said second notch portions along a respective one of said second rib portions.

2. The waffle maker according to claim 1, wherein said rib is cross-shaped.

3. A waffle maker comprising:
a first grill member comprising:
a grill body comprising a plate portion, said plate portion defining a rotational plane, and an axis contained in said rotational plane; a surrounding portion cooperating with said plate portion to define an internal receiving space, and formed with a batter inlet; and a funnel portion extending outwardly from said surrounding portion adjacent to said batter inlet, and communicating with said internal receiving space; and
a second grill member coupled to said first grill member and adapted to transition between a closed state and an open state;
one of said first grill member and said second grill member being rotatable about said axis relative to the other one of said first grill member and said second grill member to transition said second grill member from the closed state to the open state;
wherein, during the transition of said second grill member from the closed state to the open state, the other one of said first grill member and said second grill member is positioned horizontally with respect to said axis; and wherein said grill body further comprising a viewing unit, said viewing unit having a through hole extending through said grill body and being in communication with said internal receiving space said viewing unit further comprising a light transmitter inserted into said through hole.

4. The waffle maker according to claim 3, wherein:

said through hole extends from upper to lower halves of said grill body when said first grill member is at said upright position; and said light transmitter has a plurality of identification marks.

5. The waffle maker according to claim 1, wherein the length of each of said first notch portions ranges between 15 millimeters and 45 millimeters.

6. The waffle maker according to claim 1, wherein the length of each of said second notch portions ranges between 10 millimeters and 35 millimeters.

7. The waffle maker according to claim 1, wherein said rib further has a plurality of ventilation notches that are respectively recessed in said first rib portions.

8. The waffle maker according to claim 1, wherein said rib is directly connected to said surrounding portion.

9. The waffle maker according to claim 7, wherein each of said ventilation notches has a length along a respective one of said first rib portions ranging between 2 millimeters and 15 millimeters.

* * * * *